United States Patent
Boier-Martin et al.

(10) Patent No.: US 7,890,308 B2
(45) Date of Patent: *Feb. 15, 2011

(54) SYSTEM, METHOD, AND PROGRAM PRODUCT FOR RE-PARAMETERIZING THREE DIMENSIONAL MODELS REPRESENTED AS CATMULL-CLARK SUBDIVISION SURFACES

(75) Inventors: Ioana M. Boier-Martin, Pelham Manor, NY (US); Denis Zorin, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 273 days.

This patent is subject to a terminal disclaimer.

(21) Appl. No.: 12/104,552

(22) Filed: Apr. 17, 2008

(65) Prior Publication Data

US 2009/0102833 A1    Apr. 23, 2009

Related U.S. Application Data

(63) Continuation of application No. 10/721,713, filed on Nov. 25, 2003, now Pat. No. 7,369,972.

(51) Int. Cl.
*G06F 7/60* (2006.01)
*G06F 17/10* (2006.01)
*G06F 17/00* (2006.01)

(52) U.S. Cl. .......................................... 703/2; 345/420
(58) Field of Classification Search ............. 703/2; 345/423, 420
See application file for complete search history.

(56) References Cited

U.S. PATENT DOCUMENTS

| | | | | |
|---|---|---|---|---|
| 6,108,006 A | * | 8/2000 | Hoppe | 345/423 |
| 6,389,154 B1 | * | 5/2002 | Stam | 382/108 |
| 6,806,874 B2 | * | 10/2004 | Biermann et al. | 345/420 |

OTHER PUBLICATIONS

Recursively Generated B-Spline Surfaces On Arbitrary Topological Meshes by: E Catmull and J Clark, pp. 350-355, 1978.
Evaluation of Piecewise Smooth Subdivision Surfaces by Denis Zorin, Daniel Kristjansson, Media Research Lab, New York University, 719 Broadway, 12th Floor, New York, New York 10003, USA, pp. 299-315.
Implicitization Using Moving Curves and Surfaces, by: Thomas W. Sederberg and Falai Chen, Brigham Young University, pp. 301-311, 1995.
Stationary Subdivision and Multiresolution Surface Representations, by: Denis N. Zorin, pp. 1-302, Sep. 23, 1997.

* cited by examiner

*Primary Examiner* — Dwin M Craig
(74) *Attorney, Agent, or Firm* — Tutunjian & Bitetto, PC; Brian P. Verminski, Esq.

(57) ABSTRACT

A system, method, and program product for re-parameterizing one or more three-dimensional Catmull-Clark models is disclosed. Each of the models has one or more surfaces and one or more extraordinary vertices. One or more adjacent iso-parameter lines of the model have a spacing between them that increases as the iso-parameter lines approach the extraordinary vertex. A re-parameterization process that re-parameterizes the model so that one or more of the extraordinary vertices have adjacent iso-parameter lines with spacing that does not increase as the lines approach the extraordinary vertex.

16 Claims, 13 Drawing Sheets

Extraodinary vertex (210)

SYSTEM, METHOD, AND PROGRAM PRODUCT FOR RE-PARAMETERIZING THREE DIMENSIONAL MODELS REPRESENTED AS CATMULL-CLARK SUBDIVISION SURFACES

This application is a continuation of application Ser. No. 10/721,713, filed Nov. 25, 2003, now U.S. Pat. No. 7,369,972, issued on May 6, 2008, which is incorporated by reference herein in its entirety.

FIELD OF THE INVENTION

The invention relates to the field of three dimensional computer modeling. More specifically, the invention relates to re-parameterization of three dimensional computer models.

BACKGROUND OF THE INVENTION

Subdivision surfaces are emerging as a powerful representation for shape design. Their simplicity and potential to overcome difficulties associated with traditional spline-based modeling has made them a popular choice for several applications, including industrial modeling, movie production, and games.

Subdivision defines a smooth surface recursively, as the limit of a sequence of meshes. A finer mesh is obtained from a coarse mesh by applying a set of fixed refinement rules, for example the Catmull-Clark rules (see Catmull, E. and Clark, J., Recursively Generated B-Spline Surfaces on Arbitrary Topological Meshes, CAD 10(6), pp. 350-355, 1978). The initial, coarsest mesh is also known as the base mesh. FIG. 2 shows a prior art example of a base mesh and a sequence of refinements that lead to a smooth surface. A subdivision surface (FIG. 2E) is generated from an initial control polyhedron (FIG. 2A) by repeated subdivision (FIGS. 2B-2D). Control meshes obtained at several intermediate subdivision steps are shown in the middle (FIGS. 2B-2D). In this example, the Catmull-Clark subdivision scheme was applied.

The initial coarsest mesh serves as a base domain over which the resulting surface is naturally parameterized. See FIG. 3. Intuitively, the correspondence between control points on a given subdivision level and points in the base domain can be illustrated using two copies of the base mesh and applying in parallel midpoint subdivision on one copy (FIG. 3A) and Catmull-Clark subdivision on the other (FIG. 3B), as illustrated in FIG. 3. This ability to cast subdivision surfaces as parametric surfaces over a domain is crucial for many operations on this type of representation.

Some formal background on the definition and properties of natural parameterizations is now provided. A review of existing methods for exact evaluation at arbitrary parameter values is also included.

Throughout this disclosure, we use the term control point (or simply point) to refer to points computed by subdivision. We also use the term vertex to designate vertices of the polyhedron that serves as a base domain, as well as vertices added to it by midpoint subdivision. We also make use of the concepts of valence and extraordinary vertex/point. The valence of a vertex is an integer number equal to the number of faces incident to that vertex. A vertex is termed boundary vertex if it lies on the boundary of an open mesh. A vertex which is not a boundary vertex is called an interior vertex. For Catmull-Clark meshes, an interior vertex of the base mesh which has a valence different than four or a boundary vertex with valence different than two is deemed extraordinary (see vertex marked with circle 210 in FIG. 2A). The concepts of 1-ring and 2-ring around a vertex allow us to refer to the mesh neighborhood around that vertex. The 1-ring around a vertex is defined as the set of vertices belonging to faces adjacent to that vertex. The 2-ring around a vertex is defined as the set formed by the union of its 1-ring and the 1-rings of the vertices in the 1-ring different from the vertex itself. Parallel definitions can be obtained from the definitions above by replacing the word "vertex" with the word "point" to define the concepts of boundary point, interior point, extraordinary point, and 1-ring and 2-ring around a point.

More formally, let D denote the subset of $R^3$ corresponding to the base domain. Repeated subdivision generates a sequence of piecewise linear maps defined over the common domain, D. When this sequence converges uniformly (as it is the case for the Catmull-Clark scheme), the limit map $f:D \to R^3$ defines the limit surface of subdivision. For the Catmull-Clark scheme, the limit surface around an extraordinary point is completely defined by the set of points in the 2-ring around the extraordinary point. This set is called a control set. Let $f[p]$ denote the limit surface generated by subdivision from the control set p. For converging subdivision schemes, the limit function of subdivision can be decomposed into a sum of basis functions:

$$f[p](u, v) = \sum_i a_i f_i(u, v) \qquad (1)$$

These so-called eigenbasis functions are the limit functions generated by the eigenvectors of the subdivision matrix S: $f_i = f[x_i]$, where $x_i$ is the eigenvector of the subdivision matrix S corresponding to the eigenvalue $\lambda_i$: $Sx_i = \lambda_i x_i$. It has been shown in Zorin, D. Subdivision and Multiresolution Surface Representations. Pd.D. Thesis, Caltech, 1997 that the eigenbasis functions satisfy the following scaling relation:

$$f_i\left(\frac{u}{2}, \frac{v}{2}\right) = \lambda_i f_i(u, v) \qquad (2)$$

It is possible to directly evaluate subdivision surfaces and their derivatives up to any order at arbitrary parameter values without the need for explicit subdivision, as proposed in Stam, J., Exact Evaluation of Catmull-Clark Subdivision Surfaces at Arbitrary Parameter Values, Proceedings of Siggraph 98, pp. 395-404, 1998 and in Zorin, D. and Krisijansson, D., Evaluation of Piecewise Smooth Subdivision Surfaces, Visual Computer, 2002.

The evaluation algorithm described in Zorin, D. and Kristjansson, D., Evaluation of Piecewise Smooth Subdivision Surfaces, Visual Computer, 2002 is now reviewed in the context of the Catmull-Clark subdivision scheme.

The evaluation problem can be stated as follows: "Given a quadrilateral face j of the base mesh parameterized over the unit square $[0,1] \times [0,1]$ and parametric coordinates (u,v) within this face, find the value of the subdivision surface $f(u,v,j) \in R^3$ at this parameter value."

If the given quadrilateral face contains no extraordinary vertices, the surface can be evaluated as a bi-cubic spline patch defined by the control vertices of the face after an additional subdivision step. If the face contains extraordinary vertices, we can assume without restricting the generality of the problem, that it has a single extraordinary vertex (otherwise the problem can be reduced to this case after one subdivision step).

Let y=(u,v,j) be a point in the domain of the surface different from an extraordinary vertex. An important observation is that there exists a sufficiently fine subdivision level m such that y is located in a quadrilateral Q on level m and the control mesh of Q does not contain any extraordinary vertices. This means that the surface over Q is polynomial and can be evaluated explicitly (including at pointy) using bi-cubic spline evaluation. Obviously, for points closer to the extraordinary vertex, the level in is higher than for points farther away. This interpretation leads to a conceptual decomposition of the neighborhood around an extraordinary vertex into concentric layers. These layers correspond to the number of subdivision steps required to isolate the location being evaluated from the extraordinary vertex. Formally, if S denotes the subdivision matrix, the control meshes of quadrilaterals on level in can be computed from the initial control mesh by a multiplication with the m-th power of the subdivision matrix: $S^m$. These observations lead to a direct evaluation algorithm as outlined in the pseudo-code of Algorithm 1 and as illustrated in the flowchart of FIG. 5.

PROBLEMS WITH THE PRIOR ART

By definition, a surface $f:D \rightarrow R^3$ is $C^1$-continuous if for any point $x \in D$ there is a neighborhood of x, $U_x \subseteq D$ and a regular parameterization of $f(U_x)$ over the unit disk in the plane. Intuitively, this means that a surface is smooth around a given point if it behaves like a plane in its immediate vicinity.

According to this definition, the proof that the limit surface generated by a subdivision scheme is $C^1$-continuous around an extraordinary point amounts to showing that a regular parameterization as required in the definition exists at that point. It has been shown that, in the case of Catmull-Clark surfaces, such a parameterization exists and hence, they are $C^1$-continuous (see below also). However, it turns out that at the extraordinary points, the natural parameterization discussed above, do not satisfy the regularity requirement for valences greater than 4. To prove that this is the case, consider the neighborhood around an extraordinary vertex and expressions (1) and (2). For simplicity, we assume that the extraordinary vertex is situated at the origin (i.e., $a_i=0$).

If we derivate expression (1) with respect to u, we obtain:

$$\frac{\partial}{\partial u} f[p](u, v) = \sum_i a_i \frac{\partial}{\partial u} f_i(u, v)$$

The expression of the derivative with respect to v is similar and omitted for brevity. From (2), we have:

$$\frac{\partial}{\partial u} f_i\left(\frac{u}{2}, \frac{v}{2}\right) = (2\lambda_i) \frac{\partial}{\partial u} f_i(u, v)$$

and by induction, $$\frac{\partial}{\partial u} f_i\left(\frac{u}{2^m}, \frac{v}{2^m}\right) = (2\lambda_i)^m \frac{\partial}{\partial u} f_i(u, v) \quad (3)$$

From (3), it follows that for $m \rightarrow \infty$ the value $$\frac{\partial}{\partial u} f_i(0, 0)$$

is unbounded if $(2\lambda_i)>1$. For the Catmull-Clark scheme, the subdominant eigenvalue is larger than ½ for valences greater than 4, which proves our claim that derivatives computed based on the natural parameterization diverge around extraordinary points corresponding to extraordinary vertices of valence greater than 4. Using the same argument, if $(2\lambda_i)<1$ the value of $$\frac{\partial}{\partial u} f_i(0, 0)$$

is zero for $m \rightarrow \infty$. This is the case for extraordinary points corresponding to extraordinary vertices of valence 3. FIG. 4 illustrates the behavior of the iso-parameter lines around extraordinary vertices of valence 3 (FIG. 4A), 5 (FIG. 4B), and 13 (FIG. 4C), respectively. Intuitively, the behavior of the derivatives can be observed by examining the spacing between iso-parameter lines. For valences greater than 4, the spacing between consecutive lines increases as they approach the extraordinary point as the derivatives diverge. For valence 3 the spacing between iso-parameter lines decreases as the derivatives converge to zero.

All references cited above are herein incorporated by reference in their entirety.

ASPECTS OF THE INVENTION

An aspect of the invention is an improved system and method for general three-dimensional surface modeling.

An aspect of the invention is an improved system and method for re-parameterizing three-dimensional models represented as Catmull-Clark subdivision surfaces.

An aspect of the invention is an improved system and method for surface evaluation in solid modeling.

SUMMARY OF THE INDENTION

The present invention is a system and method for re-parameterizing one or more three-dimensional Catmull-Clark models. Each of the models has one or more surfaces and one or more extraordinary vertices. One or more adjacent iso-parameter lines of the model have a natural spacing between them that changes as the iso-parameter lines approach the extraordinary vertex. The invention includes a re-parameterization process that re-parameterizes the model so that one or more of the extraordinary vertices have adjacent iso-parameter lines with new spacing that is different than as the lines approach the extraordinary vertex.

BRIEF DESCRIPTION OF THE DRAWINGS

FIG. 2, comprising

FIG. 3, comprising

FIG. 4, comprising

FIG. 9, comprising

FIG. 10, comprising

FIG. 12, comprising

FIG. 13, comprising

DETAIL DESCRIPTION OF THE INVENTION

One aspect this disclosure addresses is the issue of robust, constant-time evaluation of subdivision surfaces and their first-order derivatives near extraordinary vertices. It is well-known that the evaluation of first-order derivatives based on the natural parameterization of subdivision surfaces is unstable as the derivatives diverge near extraordinary vertices of valence greater than four. Two alternative novel preferred embodiments of re-parameterization methods around extraordinary vertices are presented. The first one ensures that the derivatives after re-parameterization converge to zero around extraordinary vertices. This method is relatively simple to implement, however vanishing derivatives may be problematic in certain applications. The second approach, although slightly more involved, provides a general robust method to compute a regular parameterization around extraordinary vertices with guaranteed well-behaved derivatives. It is based on the inversion of the characteristic map.

Figure 1:
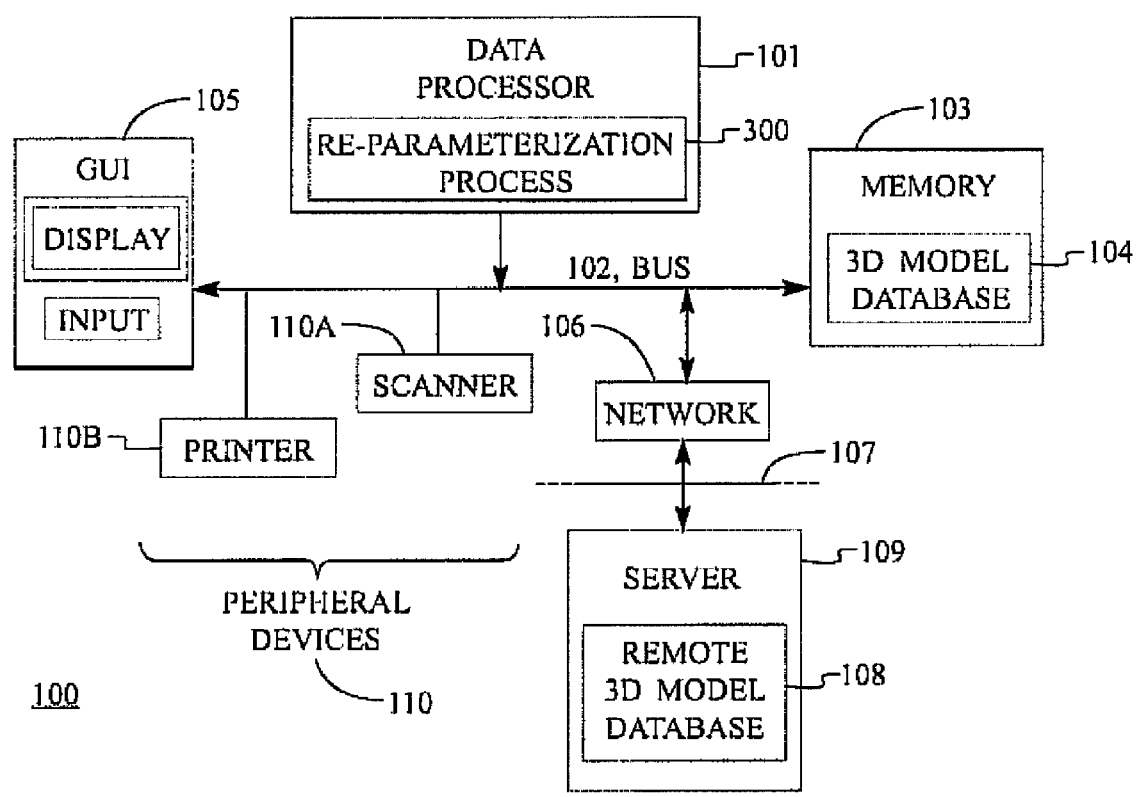
FIG. 1 is a block diagram of one preferred system comprising the present invention.
Figure 2C:
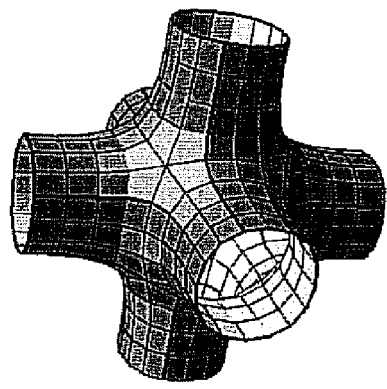
FIGS. 2A-2E, illustrates a prior art subdivision process.
Figure 2E:
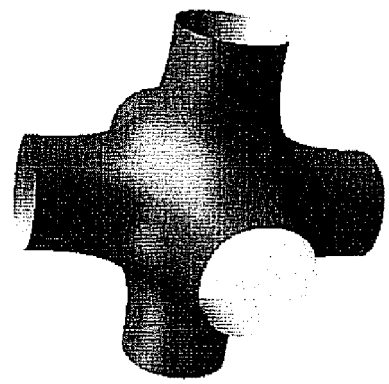
Figure 2B:
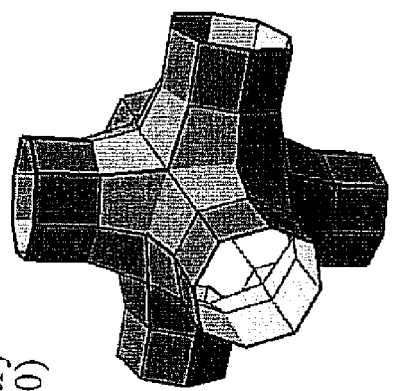
Figure 2D:
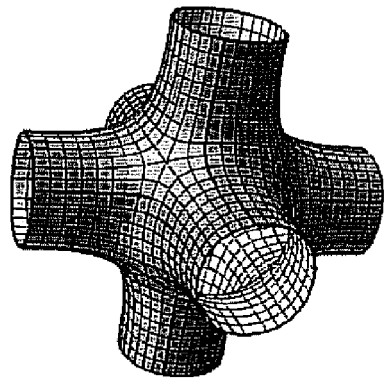
Figure 2A:
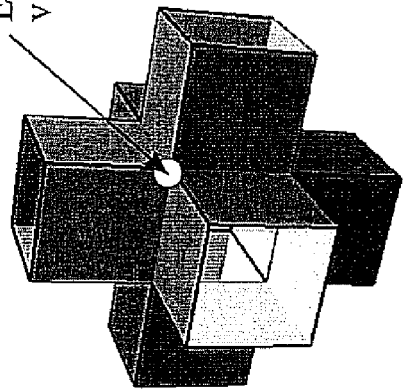
Figures 3A, 3B:
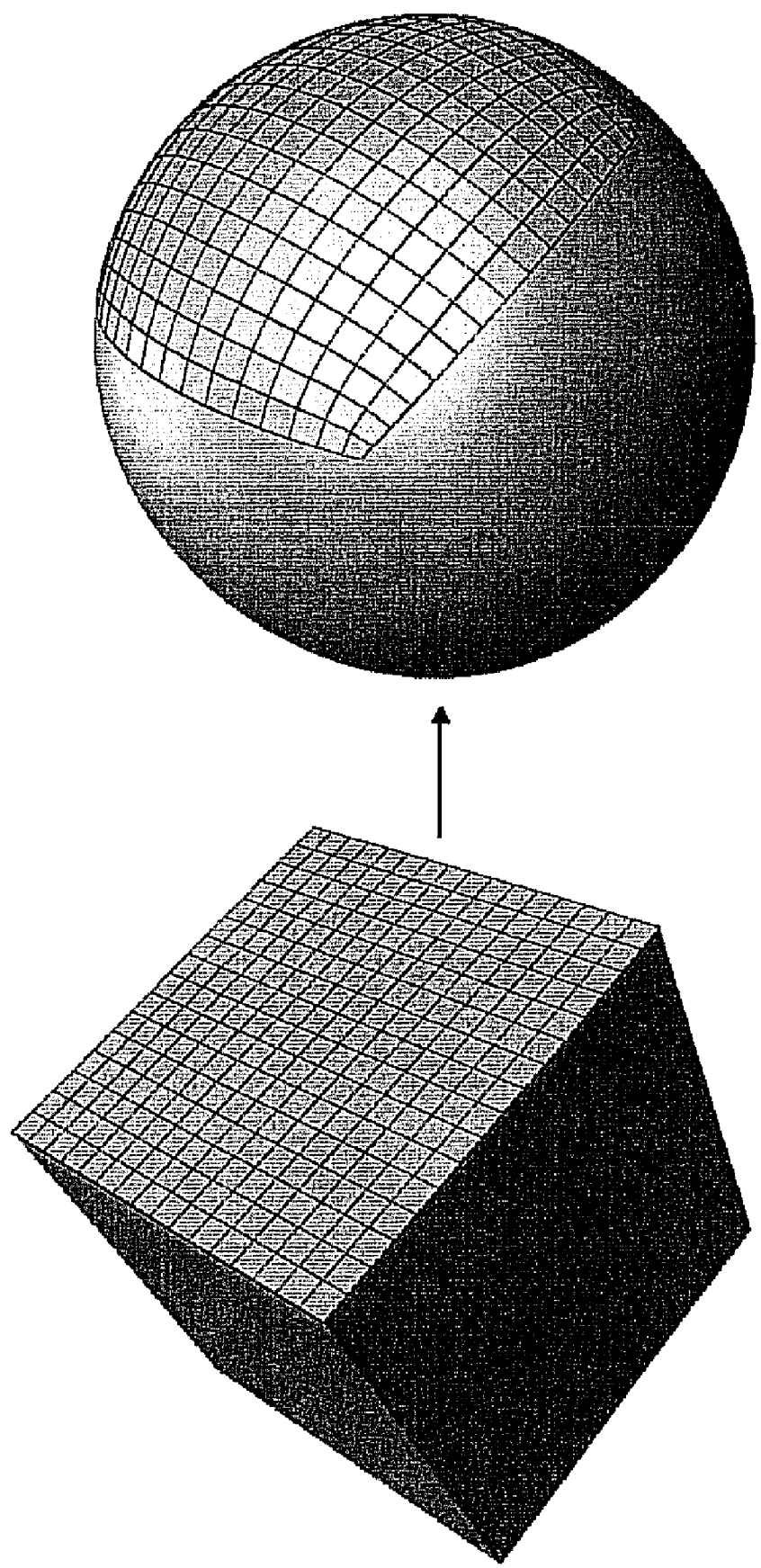
FIGS. 3A and 3B, illustrates a prior art natural parameterization of subdivision surfaces.
Figure 4B:
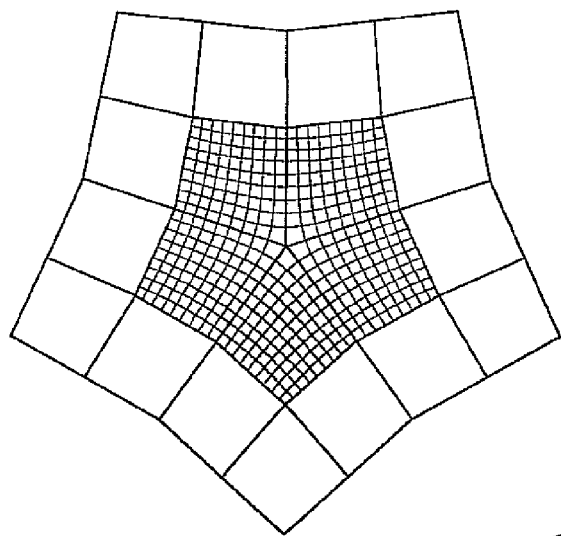
FIGS. 4A-4C, illustrates the prior art behavior of the iso-parameter lines around extraordinary vertices of valence 3 (FIG. 4A), 5 (FIG. 4B), and 13 (FIG. 4C), respectively.
Figure 4C:
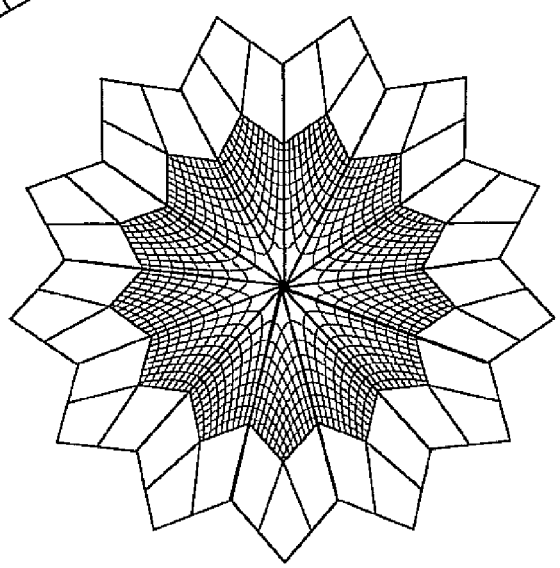
Figure 4A:
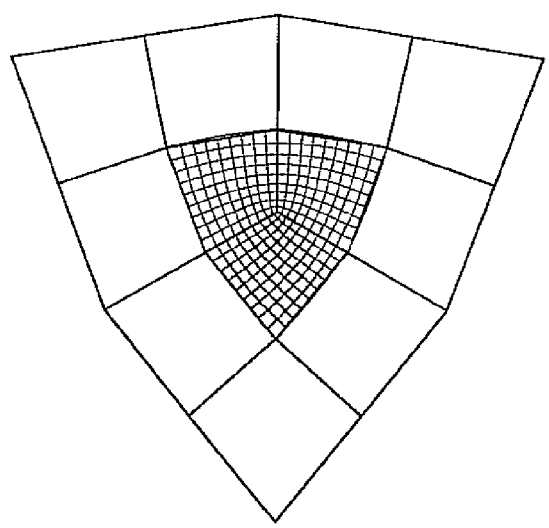

FIG. 1 is one example and simplified block diagram of a preferred data processing system 100 that is suitable for practicing this invention. The data processing system 100 includes at least one data processor 101 coupled to a bus 102 through which the data processor 101 may address a memory subsystem 103, also referred to herein simply as the memory 103. The memory 103 may include RAM, ROM and fixed and removable disks and/or tape. The memory 103 is assumed to store a program containing program instructions for causing the data processor 101 to execute methods in accordance with the teachings of this invention. Also stored in the memory 103 can be at least one database 104 of digital 3D models, such as models of objects, a non-limiting example of which is shown in FIG. 2. The digital model data may include models obtained by scanning real objects using a 3D scanner, digital models created using a computer, models imported from existing databases, and/or models generated by or derived from any suitable means. In general, the digital model data may be any desired type or types of 3D models, including but not limited to digital models of persons, places, animals, plants, mechanical parts and assemblies, packaging, containers, abstract forms and so forth. For the purpose of this invention, the models are assumed to be represented as Catmull-Clark subdivision surfaces with or without multiresolution details.

The data processor 101 is also coupled through the bus 102 to a user interface, preferably a graphical user interface (GUI) 105 that includes any one or more of the following well known user interface devices: a keyboard, a mouse, a trackball, a voice recognition interface, and any general purpose user display device, such as a high resolution graphical CRT display terminal, a LCD display terminal, or any suitable other display device.

The data processor 101 may also be coupled through the bus 102 to a network interface 106 that provides bidirectional access to a data communications network 107, such as an intranet and/or the internet. Coupled to the network 107 can be one or more sources and/or repositories of digital models, such as a remote digital model database 108 that is reachable through an associated server 109.

The data processor 101 is also preferably coupled through the bus 102 to at least one peripheral device 110, such as a scanner 110A (e.g., a 3D scanner) and/or a printer 110B and/or a 3D model making apparatus, such as a rapid prototyping system, and/or a computer controlled fabrication system.

In general, this invention may be implemented using one or more software programs running on a personal computer, a server, a microcomputer, a mainframe computer, a portable computer, and embedded computer, or by any suitable type of programmable data processor 101.

Given His disclosure, many other system architectures would become known to one skilled in the art.

The use of this invention substantially improves the evaluation of 3D model data represented as a Catmull-Clark subdivision surface for many applications that require surface evaluation (for example, surface editing and boolean operations). The methods may be used to process the digital 3D model data stored in the 3D model database 104 and/or in the remotely stored 3D model database 108 over the network 107 and in cooperation with the server 109. As but one example, a 3D input subdivision surface model to be evaluated could be remotely stored in the 3D model database 108a, while the evaluated limit surface corresponding to the model could be stored in the local 3D model database 104.

Figure 6:
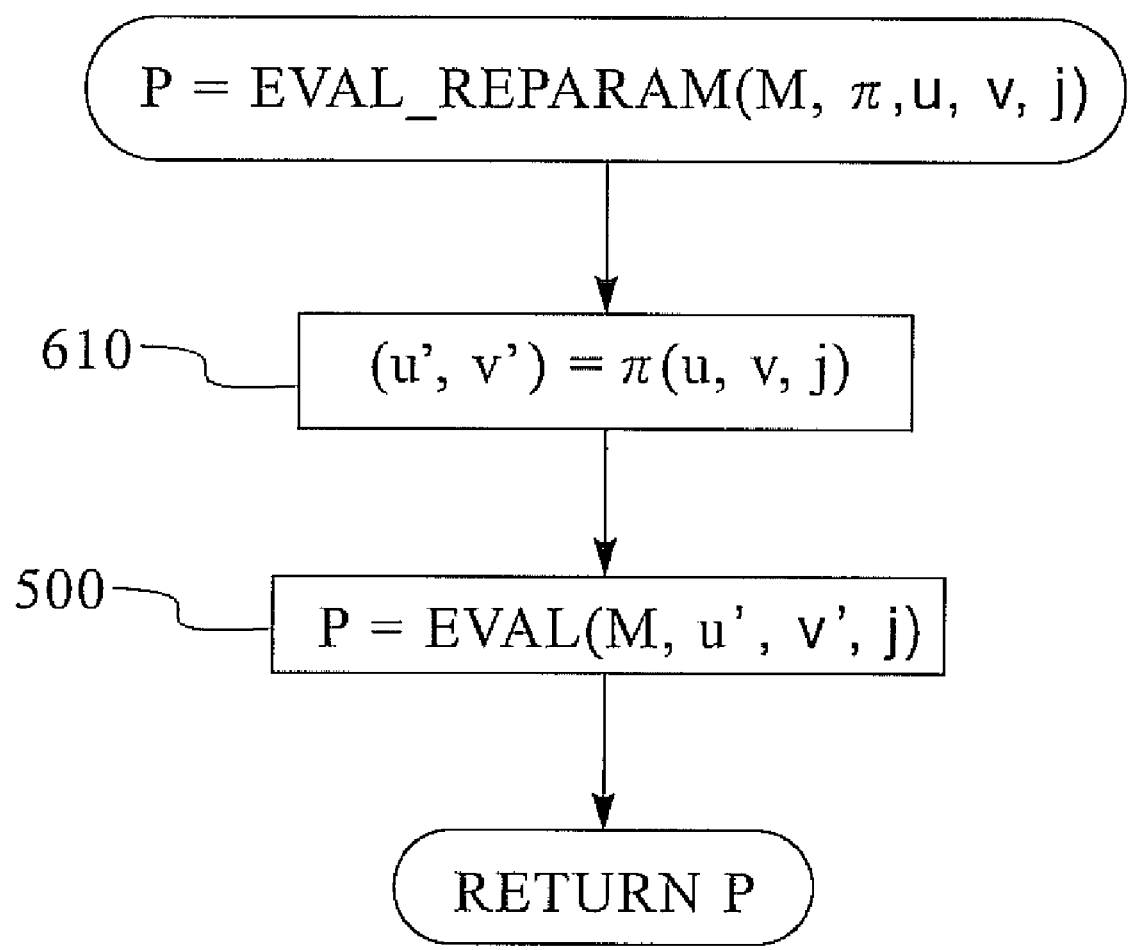
FIG. 6 is a flow chart of a novel re-parameterization process.

The invention includes an evaluation process 600, shown in more detail in FIG. 6.

Figure 5:
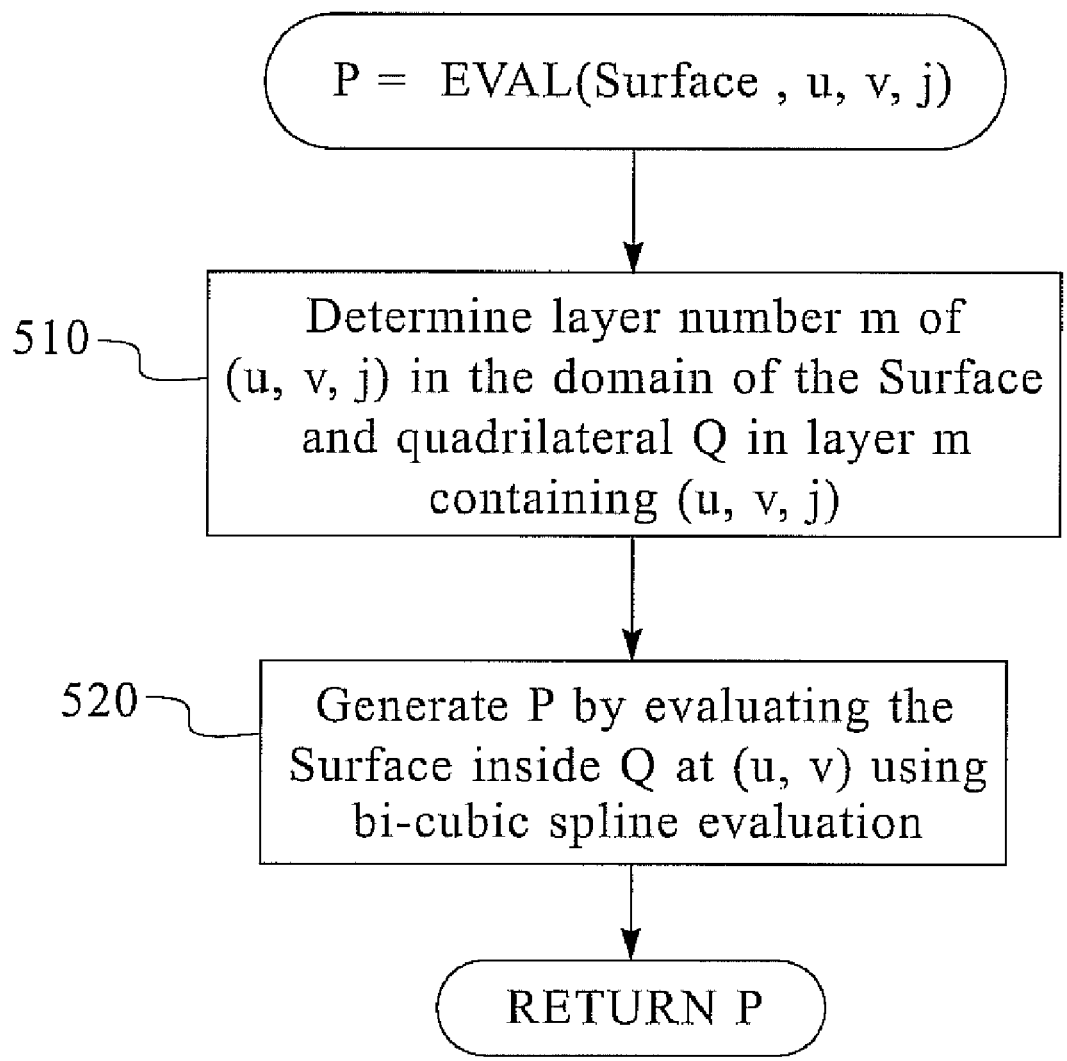
FIG. 5 is a flow chart of a prior art surface evaluation process.

FIG. 5 is a flow chart of a prior art surface evaluation process.

A typical prior art algorithm for evaluating subdivision surfaces at arbitrary parameter values is as follows:

$P=\text{Eval}(\text{Surface},u,v,j)$  Algorithm 1

Given a location $y=(u,v,j)$ in the domain of the Surface, step 510 comprises determining a layer number m of $(u,v)$, i.e., a sufficiently fine subdivision level m such that y is located in a quadrilateral Q on level m, and the control mesh of this quadrilateral does not contain any extraordinary vertices. Inside Q the surface is polynomial and it can be evaluated explicitly at $(u,v)$ using bi-cubic spline evaluation (520) to obtain the evaluated point P on the surface.

While these are typical main steps in prior art methods, their specifics may differ. For two different examples see Stam, J., Exact Evaluation of Catmull-Clark Subdivision Surfaces at Arbitrary Parameter Values, Proceedings of Siggraph 98, pp. 395-404, 1998 and Zorin, D. and Kristjansson, D., Evaluation of Piecewise Smooth Subdivision Surfaces, Visual Computer, 2002.

FIG. 6 is a flow chart of a novel re-parameterization process.

Since the limit surface in the case of the Catmull-Clark scheme is $C^1$-continuous, we know that a regular parameterization around each extraordinary vertex exists. In order to implement an evaluator that generates derivatives that converge at extraordinary vertices, we have to find such re-parameterizations around these vertices. The general format of a new evaluation algorithm we propose involves using a re-parameterization mapping $\pi$ as follows:

$$P = \text{Eval}R\text{param}(\text{Surface}, u, v, j) \qquad \text{Algorithm 2}$$

In order to determine a new location for a given parametric point that has undergone a transformation due to a re-parameterization, we compute the image of the parametric point being evaluated through the re-parameterization mapping $\pi$: $(u',v',j) = (\pi(u,v),j)$ (610) and use the newly computed parametric point $(u',v',j)$ as input to the prior art evaluation process 500 (also described in Algorithm 1). The resulting point on the surface is the output of the latter: $P = \text{Eval}(\text{Surface}, u', v', j)$ We propose two novel methods for generating a re-parameterization mapping $\pi$.

The first one (see FIG. 7) entails a simple mapping that ensures that the surface has continuous first order derivatives that converge to 0 around extraordinary points. Such a mapping is relatively easy to implement, however vanishing derivatives may cause problems for certain applications. The second approach (see FIG. 8) is to use the inverse of the characteristic map for re-parameterization. Although it requires a more involved implementation, this method offers the most robust alternative backed by theoretical guarantees that ensure a regular parameterization and hence, well-behaved first-order derivatives. We discuss these two methods next.

Figure 7:
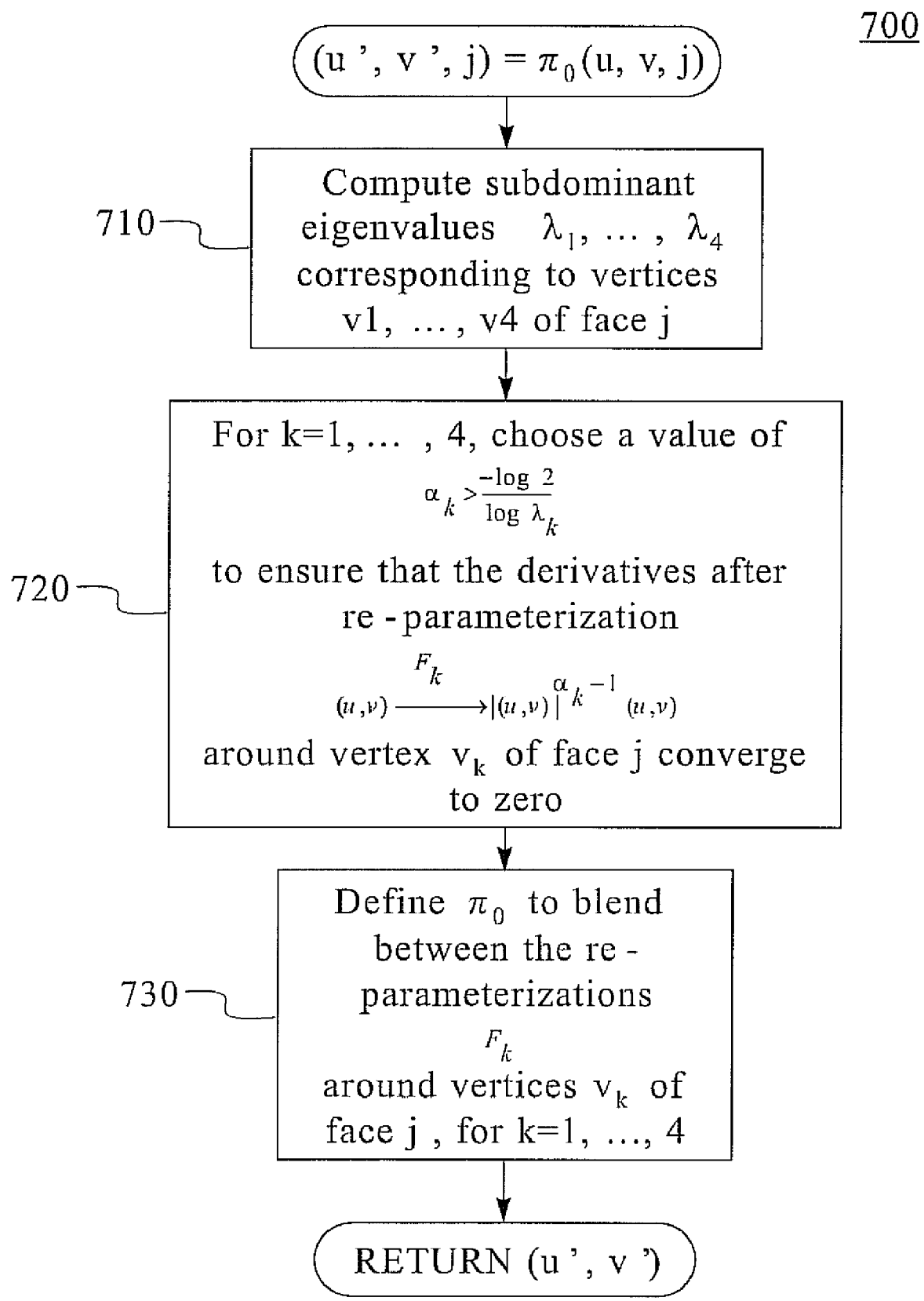
FIG. 7 is a flow chart of one preferred vanishing derivative re-parameterization process that is used in the re-parameterization process of FIG. 6.

The first re-parameterization method is described next. FIG. 7 is a flow chart of one preferred vanishing derivative re-parameterization process that is used in the re-parameterization process of FIG. 6.

Our approach is to use a re-parameterization of the form:

$$x \xrightarrow{F} |x|^{\alpha-1} x$$

around each vertex of a base mesh face j, where we denote by $x = (u,v)$ the parametric point being evaluated inside face j. At each vertex, according to (3), in order to ensure that the derivatives converge after re-parameterization we need to impose the condition $$\alpha > -\frac{\log 2}{\log \lambda} \qquad (4)$$

where $\lambda$ is the subdominant eigenvalue of the subdivision matrix corresponding to the valence of that vertex.

The idea behind the choice of constant in the right-hand side of expression (4) is to induce a scaling relation of the form (3), but with a scaling factor that converges to zero as m tends to infinity. If such a factor is chosen to be, for instance, of the form $2^{1/\alpha}\lambda$ with $\alpha$ as in (4), then convergence to zero is ensured.

Thus, we first must compute the four subdominant eigenvalues $\lambda_1, \ldots, \lambda_4$ of the subdivision matrices corresponding to the four vertices of face j in which evaluation takes place (710). Then we select appropriate values $\alpha_k, k=1, \ldots, 4$ which satisfy condition (4)(720) ensuring that, after a re-parameterization of the form $$x \xrightarrow{F_k} |x|^{\alpha_k - 1} x,$$

the derivatives around vertex k converge to zero, for all $k=1, \ldots, 4$. If any of the vertices have valence less than or equal to four we use the natural parameterization around those vertices, i.e., as $\alpha_k = 1$.

Using this kind of re-parameterization around the vertices of the base domain we ensure that the function defining the surface has continuous derivatives that converge to zero around those vertices.

We can now create a re-parameterization mapping $\pi_0$ (730) by blending together the four re-parameterization functions $F_k, k=1, \ldots, 4$ using a weighted sum as defined in (5);

$$\pi(u, v) = \frac{\sum_{k=1}^{4} w(|T_j(u, v)|) T_k(F_k(T_k(u, v)))}{\sum_{k=1}^{4} w(|T_k(u, v)|)} \qquad (5)$$

where $F_k(x) = |x|^{\alpha_k - 1} x$ is the re-parameterization at vertex k, $T_k$ is a rotation function that places the extraordinary vertex at the origin of the parameter space, and w is a weighting function satisfying boundary conditions:

$$w(0)=1, w(1)=0, w'(r)=w''(r)=0, r=0,1.$$

For examples of weighting functions see section 3.3.

Figure 9B:
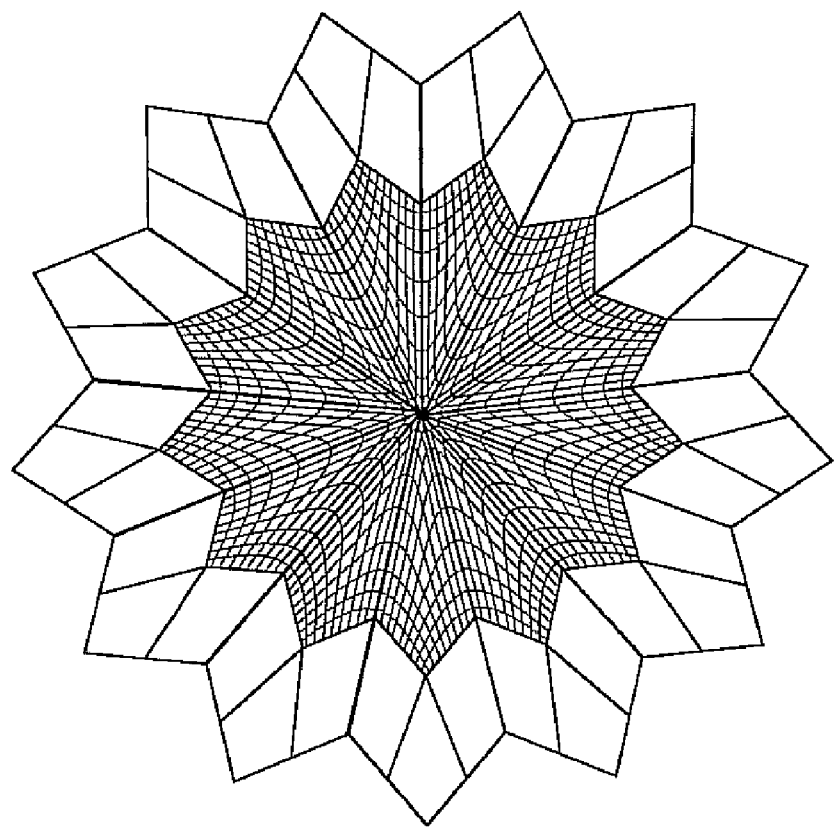
FIGS. 9A and 9B, illustrates the behavior of the iso-parameter lines around extraordinary vertices of valence 5 (FIG. 9A), and 13 (FIG. 9B), respectively after re-parameterization with vanishing derivatives.
Figure 9A:
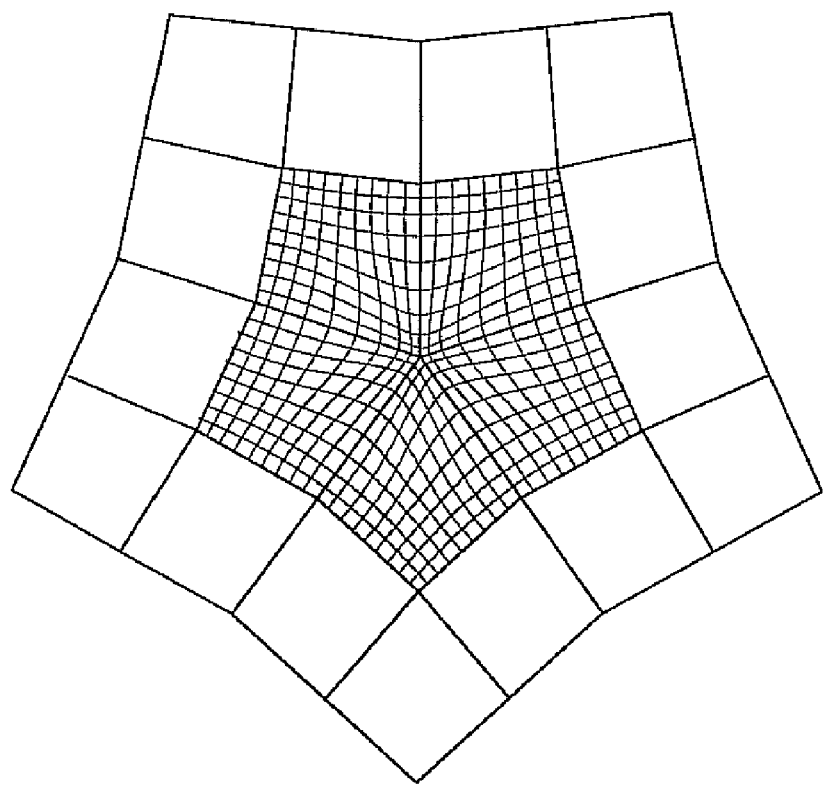

FIG. 9, comprising FIGS. 9A-9B, illustrates the behavior of the iso-parameter lines around extraordinary vertices of valence 5 (FIG. 9A), and 13 (FIG. 9B), respectively after re-parameterization with vanishing derivatives. Note that as the valence increases, the spacing between consecutive lines decreases.

The second method for generating a re-parameterization mapping $\pi$ makes use of the concept of a characteristic map. This notion is briefly reviewed next.

Figure 10C:
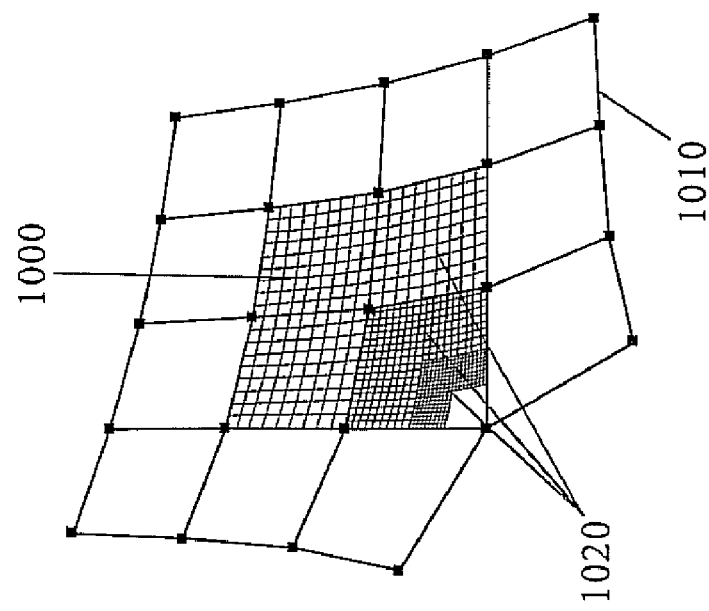
FIG. 10A-10C, illustrates prior examples of control meshes and corresponding characteristic maps for the Catmull-Clark scheme for valences 3 (FIG. 10A), 4 (FIG. 10B), and 5 (FIG. 10C).
Figure 10B:
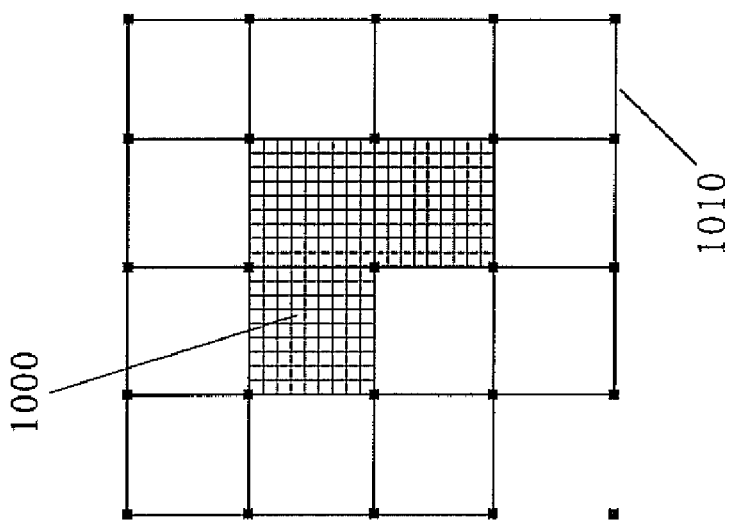
Figure 10A:
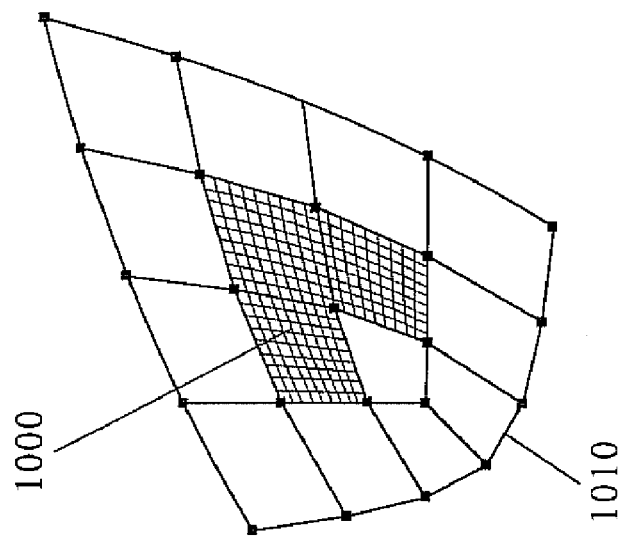

It has been shown that control points near a vertex converge, up to an affine transformation, to a limit configuration that is independent of the control points of the original mesh (see Zorin, D. Subdivision and Multiresolution Surface Representations. Pd.D. Thesis, Caltech, 1997). This result motivates the introduction of the concept of a characteristic map. Informally, any subdivision surface generated by a given subdivision scheme behaves near an extraordinary vertex of valence k like the characteristic map of that scheme for valence k. Formally the characteristic map is defined as follows:

Definition The characteristic map of a subdivision scheme for valence k is the map $\Phi: U \to R^2$ defined as $\Phi = f_{2D}[e_1 x_1 + e_2 x_2]$, where $e_1$ and $e_2$ are unit coordinate vectors, $x_1$ and $x_2$ are subdominant eigenvectors, and $f_{2D}[p]: U \to R^2$ is the limit surface of subdivision generated by subdivision on U from the 2D control points p. FIG. 10, comprising FIG. 10A-10C, illustrates prior examples of characteristic maps for the Catmull-Clark scheme for valences 3 (FIG. 10A), 4 (FIG. 10B), and 5 (FIG. 10C). The control mesh in each of these figures is shown as 1010 and images of regularly sampled points through the characteristic map are shown as 1000. For valence 5, the structure of layers and patches around the extraordinary vertex is also illustrated in FIG. 10C as 1020.

The characteristic map plays an important role in the analysis of smoothness properties of subdivision schemes.

The Catmull-Clark scheme along with other popular subdivision schemes has been proven to be $C^1$-continuous at extraordinary vertices. For such schemes, the characteristic map $\Phi$ can be inverted and a parameterization of the surface around the extraordinary vertex of the form: $f(\Phi^{-1}(s))$, where $s \in \Phi(U)$ can be obtained. This observation stands at the basis of our new re-parameterization scheme.

Figure 8:
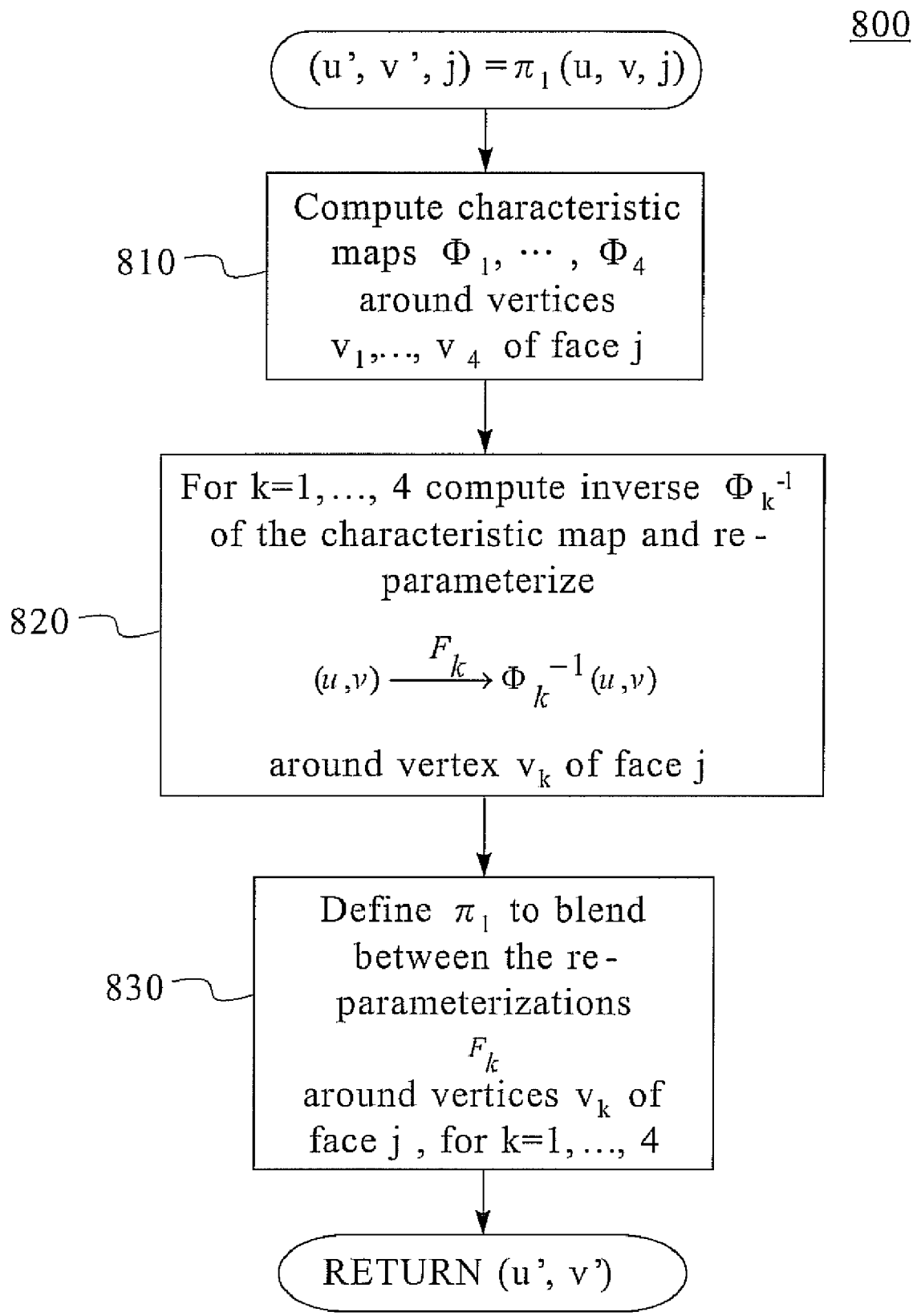
FIG. 8 is a flow chart of one preferred characteristic map re-parameterization process that is used as an alternative process in the re-parameterization process of FIG. 6.

FIG. 8 is a flow chart of one preferred characteristic map re-parameterization process that is used as an alternative process in the re-parameterization process of FIG. 6.

We use a re-parameterization of the form:

$$x \xrightarrow{F} \Phi^{-1}(x)$$

around each vertex of a base mesh face j, where we denote by $x=(u,v)$ the point being evaluated inside face j.

First we compute the four characteristic maps $\Phi_1, \ldots, \Phi_4$ corresponding to the four vertices of face j in which evaluation takes place (810). Then we invert the characteristic maps obtaining $\Phi^{-1}_1, \ldots, \Phi^{-1}_4$ (820) and we use these inverses to re-parameterize the region around each of the four vertices using a re-parameterization of the form $$x \xrightarrow{F_k} \Phi_k^{-1}(x).$$

Using this kind of re-parameterization around the vertices of the base domain we ensure that the function defining the surface has continuous derivatives that converge to the actual derivative of the surface around those vertices.

We can now create a re-parameterization mapping $\pi_1$ (830) by blending together the four re-parameterization functions using a weighted sum as defined in (5), with $F_k(x)=\Phi_k^{-1}(x)$ being the re-parameterization at vertex k.

The characteristic map defines a smooth variation of parametric positions in the parameter domain around the extraordinary vertex. By re-parameterizing the surface around the extraordinary vertex using this map, we ensure that a similarly smooth variation occurs on the surface.

Figure 11:
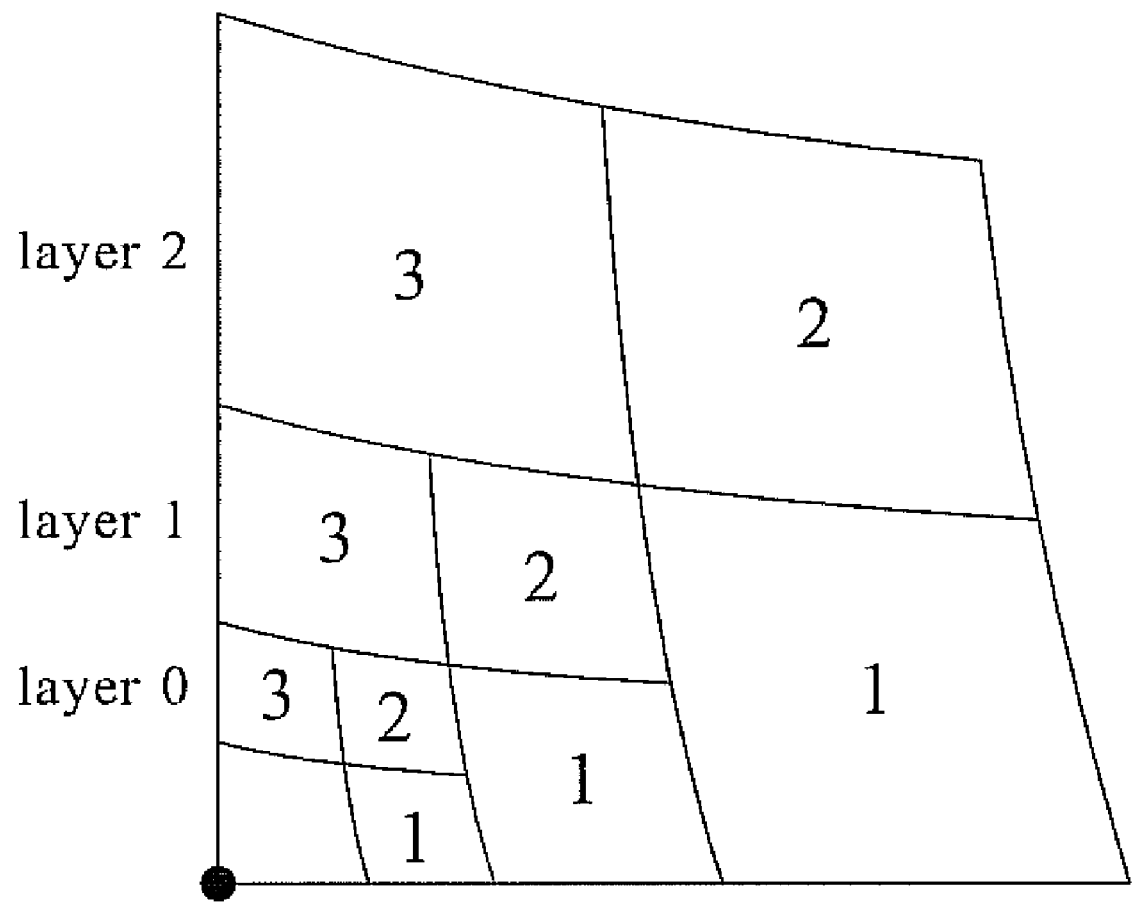
FIG. 11 shows an example prior art structure of layers and patches of the characteristic map around an extraordinary vertex.

We avoid the need to explicitly compute an inverse of the characteristic map by talking advantage of an organization into layers and patches around the extraordinary vertex as shown in FIG. 10C and FIG. 11. The numbers in FIG. 11 indicate an example indexing scheme of patches within a layer.

To compute the image of a point (u,v) in the domain of the surface through the inverse map $\Phi^{-1}$ we use the following procedure:

$(u',v')=\Phi^{-1}(u,v)$  Algorithm 3

First we determine the layer L of the characteristic map and the polynomial patch $P_L$ within L that contains the point (u,v). Layer L corresponds to a sufficiently fine subdivision level such that (u,v) is located in a patch $P_L$ on that. Inside $P_L$ we can use inverse polynomial evaluation to obtain (u',v').

As shown in FIG. 11, the domain is bounded by parametric curves rather than straight lines. To locate the layer and patch containing a given point in this type of domain we first determine an approximate location of the given point (u,v) using bounding boxes of layers and patches. We then refine the search for the exact layer and patch by searching in a restricted region around the approximate location. For this we need to classify the position of the point (u,v) with respect to the curves bounding the layers and patches, as shown in FIG. 11. We transform these cubic polynomial curves from their parametric representation to an implicit one using a process of implicitization. Implicitization refers to the process of extracting an implicit representation for a curve given in parametric form. Such a problem arises often when attempting to decide whether a given point lies on a given curve or not. The implicit representation offers an efficient way of Ending the answer through a simple comparison test.

One example method for implicitzation is described in Sederberg, T. W. and Chen, F., Implicitization Using Moving Curves and Surfaces, Proceedings of SIGGRAPH'95, pp. 301-308, 1995. An alternative method is based on computing resultants and is briefly described next.

Definition. Let $p(t)=a_m x^m + a_{m-1} x^{m-1} + \ldots + a_0$ and $q(t)= b_n x^{n-1} + \ldots + b_0$ denote two scalar polynomials such that at least one of $a_m$ and $b_n$ is non-zero. The Sylvester resultant of the two polynomials is defined as the determinant of the following $(m+n) \times (m+n)$ Sylvester matrix:

$$S(p,q) = \begin{bmatrix} a_0 & a_1 & a_2 & \ldots & a_{m-1} & a_m & 0 & 0 & \ldots & 0 \\ 0 & a_0 & a_1 & \ldots & a_{m-2} & a_{m-1} & a_m & 0 & \ldots & 0 \\ \vdots & \vdots & \ddots & \ddots & \vdots & \vdots & \vdots & \ddots & \ddots & \vdots \\ 0 & 0 & 0 & \ldots & a_0 & a_1 & a_2 & a_3 & \ldots & a_m \\ b_0 & b_1 & b_2 & \ldots & & & \ldots & 0 & \ldots & 0 \\ 0 & b_0 & b_1 & \ldots & & & \ldots & 0 & \ldots & 0 \\ \vdots & \vdots & \ddots & \ddots & \vdots & \vdots & \vdots & \ddots & \ddots & \vdots \\ 0 & 0 & 0 & \ldots & & \ldots & & b_0 & b_1 & \ldots & b_n \end{bmatrix}$$

The link between the Sylvester resultant and the common roots of the polynomials is given by the following well-known result:

Theorem. Polynomials p and q have a common root if and only if det $S(p,q)=0$.

We use the Sylvester resultants to solve the implicitization problem.

The implicitization of a parametric polynomial curve $C(t)=(x(t),y(t))$ using polynomial resultants is described next.

Let $(x_0,y_0) \in C$ be an arbitrary point on the curve and let us consider the polynomials $p_x(t)=x(t)-x_0$ and $p_y(t)=y(t)-y_0$. Clearly, since $(x_0,y_0)$ is on the curve, a common root $t_0$ of the polynomials $p_x$ and $p_y$ must exist. According to the previous theorem, this can happen if and only if det $S(p_x,p_y)=0$. Thus, det $S(p_x,p_y)=0$ constitutes the implicit representation of the curve C.

In our case, the curves delineating layers and patches are defined by cubic polynomials (see FIG. 11);

$$\gamma(t)=(A_1+B_1 t+C_1 t^2+D_1 t^3, A_2+B_2 t+C_2 t^2+D_2 t^3)$$

Hence, the implicit representation of such curves is extremely simple:

$$\Gamma(x, y) : \det \begin{bmatrix} A_1 - 1x & B_1 & C_1 & D_1 & 0 & 0 \\ 0 & A_1 - x & B_1 & C_1 & D_1 & 0 \\ 0 & 0 & A_1 - x & B_1 & C_1 & D_1 \\ A_2 - y & B_2 & C_2 & D_2 & 0 & 0 \\ 0 & A_2 - y & B_2 & C_2 & D_2 & 0 \\ 0 & 0 & A_2 - y & B_2 & C_2 & D_2 \end{bmatrix} = 0$$

To determine on what side of the curve Γ(x,y) a given point (x₀,y₀) is, we simply compare Γ(x₀,y₀), to 0 (or some ε to account for numerical precision errors).

Once a patch containing the input point (u,v) is found, we must compute the pre-image of this point through the inverse of the patch. While there are several options to compute the inverse of a polynomial surface patch, we illustrate here one such method based on Newton's approach to root finding. However, we note that any polynomial patch inversion method could be used instead.

Given a polynomial patch P(u',v') and a point (u,v) inside the patch, we need to find a point (u',v') such that (u',v')=P⁻¹(u,v). In other words, we have to find (u',v') that satisfies the equation:

$$\mathcal{P}(u', v') - \begin{pmatrix} u \\ v \end{pmatrix} = 0 \qquad (6)$$

Newton's method is a root finding algorithm that uses the first few terms of the Taylor series of a function in the vicinity of a suspected root to approximate the actual.

If P(u',v')=(P₁(u',v'),P₂(u',v')) is the patch containing (u,v), let Q(u',v')=(P₁(u',v')−u,P₂(u',v')−v) be the cubic polynomial corresponding to equation (6). We are looking for a root of the equation Q(u',v')=0 inside the domain [0,1]×[0,1]. To find it, we apply Newton-type iterations, starting from an initial guess at the center of the domain:

$$\begin{pmatrix} u'_{n+1} \\ v'_{n+1} \end{pmatrix} = \begin{pmatrix} u'_n \\ v'_n \end{pmatrix} - [J_Q(u'_n, v'_n)]^{-1} Q(u'_n, v'_n)$$

$$(u'_0, v'_0) = (0.5, 0.5)$$

We iterate until the approximation error becomes smaller than a given threshold. In our experiments we have observed the convergence to be very fast, typically requiring less than five iterations.

Figure 12B:
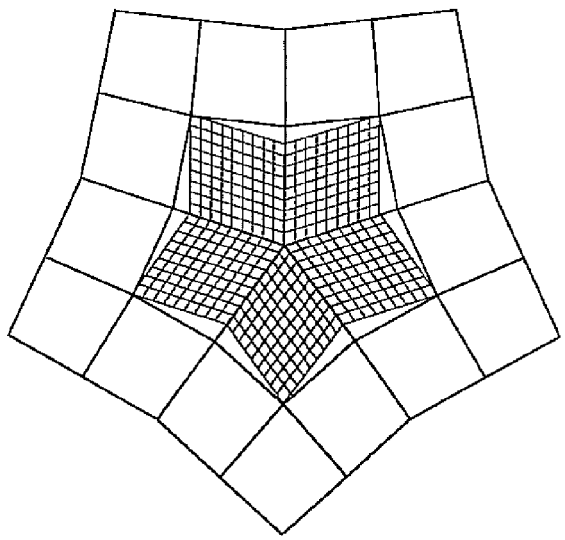
FIGS. 12A-12C, shows iso-parameter lines corresponding to parameterization by inversion of the characteristic map around vertices of valence 3 (FIG. 12A), 5 (FIG. 12B), and 13 (FIG. 12C), respectively.
Figure 12C:
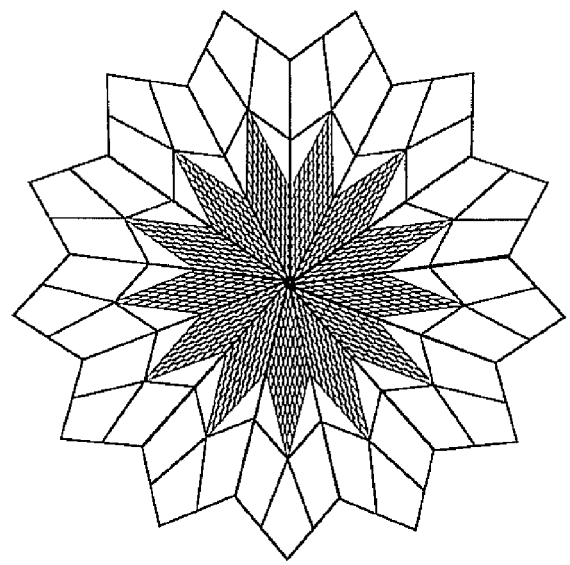
Figure 12A:
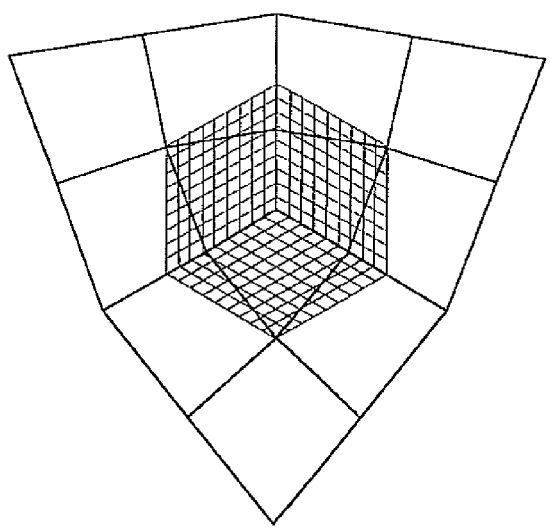

FIG. 12, comprising FIGS. 12A-12C, shows iso-parameter lines corresponding to re-parameterization by inversion of the characteristic map around vertices of valence 3 (FIG. 12A), 5 (FIG. 12B), and 13 (FIG. 12C), respectively. Note that as the valence increases, the spacing between consecutive lines remains constant.

Each of the two re-parameterization methods described in this invention makes use of a blending procedure to accommodate base faces with more than one extraordinary vertex. To blend re-parameterizations around different vertices of the same base face we use weighting functions that smoothly fall off away from the vertex. An example choice of weighting function has the form $$w(r)=B(kr-1)+B(kr)+B(kr+1) \qquad (7)$$

with k a positive integer constant and B the piecewise cubic B-spline function defined as:

$$B(t) = \begin{cases} 0, t \leq 2 \\ \frac{4}{3} + 2t + t^2 + \frac{1}{6}t^3, -2 < t \leq -1 \\ \frac{2}{3} - t^2 - \frac{1}{2}t^3, -1 < t \leq 0 \\ \frac{2}{3} - t^2 + \frac{1}{2}t^3, 0 < t \leq 1 \\ \frac{4}{3} - 2t + t^2 - \frac{1}{6}t^3, 1 < t \leq 2 \\ 0, 2 < t \end{cases} \qquad (8)$$

Figure 13A:
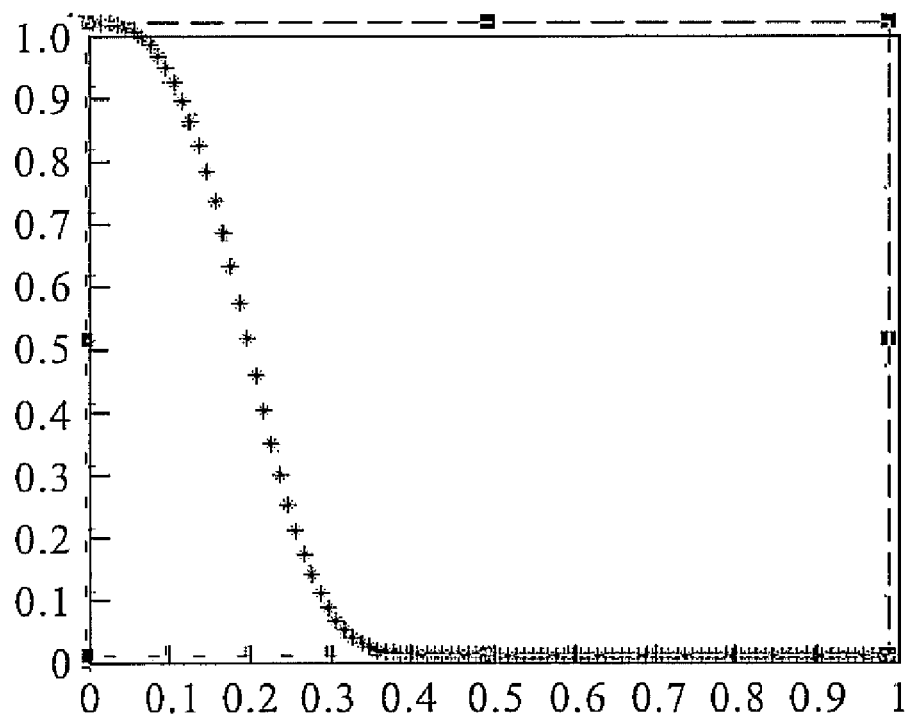
FIGS. 13A and 13B, shows a graph and shape of a weighting function w for two different values of the parameter k: k=3 (FIG. 13A) and k=6 (FIG. 13B).
Figure 13B:
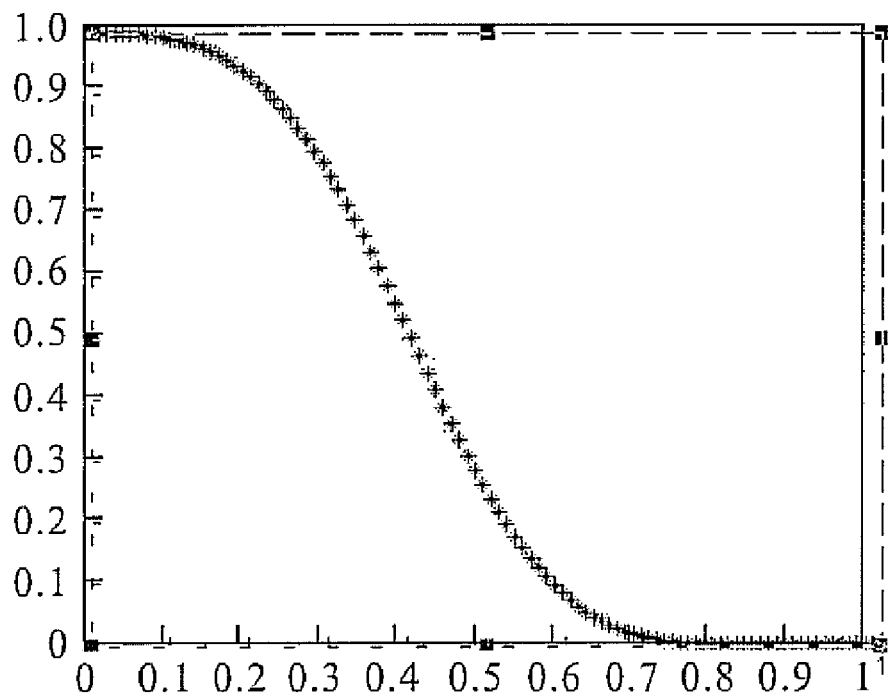

The graphs of this function for values of k=3 and k=6 are shown in FIGS. 13A and 13B, respectively.

We claim:

1. A three dimensional model re-parameterization computer system comprising:
    a processor configured to perform a re-parameterization process that re-parameterizes one or more Catmull-Clark models to create a re-parameterized model such that first-order derivatives based on the re-parameterized model converge near extraordinary vertices of valence greater than four, each of the Catmull-Clark models having one or more extraordinary vertices and one or more adjacent iso-parameter lines that have a natural spacing that changes, the re-parameterized model having iso-parameter lines with a new spacing that is different than the natural spacing as the lines approach the extraordinary vertex; and
    a memory configured to store the iso-parameter lines with the new spacing.

2. A system, as in claim 1, where derivatives evaluated at one or more parameter values of one or more limit surfaces of subdivision of the Catmull-Clark model approach zero as one or more parameter positions approach the extraordinary vertex.

3. A system, as in claim 1, where derivatives evaluated at one or more parameter values of a limit surface of subdivision of the Catmull-Clark model approach an actual derivative of the limit surface at the extraordinary point as one or more parameter positions approach the extraordinary vertex.

4. A system, as in claim 1, where the new spacing decreases as the iso-parameter lines approach one or more of the extraordinary vertices.

5. A method, as in claim 1, where the new spacing is uniform as the iso-parameter lines approach one or more of the extraordinary vertices.

6. A method for surface re-parameterization of a surface around extraordinary vertices of a computer three-dimensional Catmull-Clark model with a plurality of vertices, at least one extraordinary vertex, and iso-parameter lines with a natural spacing, the method comprising the step of:
    re-parameterizing one or more subdivision surfaces of the Catmull-Clark model around one or more of the extraordinary vertices into a re-parameterized surface with a new spacing that is different than the natural spacing as the iso-parameter lines approach the extraordinary vertex, the one or more sub-division surfaces being re-parameterized such that first-order derivatives based on the re-parameterized surface converge near extraordinary vertices of valence greater than four; and at least one of storing the iso-parameter lines with the new spacing and displaying the iso-parameter lines with the new spacing.

7. A method, as in claim 6, further comprising the step of evaluating the re-parameterized surface at one or more parameter positions.

8. A method, as in claim 6, where the re-parameterizing comprises the following steps:
computing a characteristic map corresponding to each of the vertices of a face, being face vertices, of a quadrilateral mesh containing one or more points being evaluated;
computing an inverse characteristic map for each of the face vertices; and
blending the inverse characteristic maps of the four face vertices to create the re-parameterization.

9. A method, as in claim 8, where the characteristic map is used to obtain a continuously differentiable parameterization around one or more of the extraordinary vertices.

10. A method, as in claim 8, where the inverse characteristic map is computed by locating a layer on the surface and a polynomial patch within that layer that contains the point to be evaluated and then computing a re-parameterized position of the input point by polynomial patch inversion.

11. A method, as in claim 6, where the blending is a blending of the re-parameterizations of two or more extraordinary vertices.

12. A method, as in claim 6, where the new spacing decreases as the iso-parameter lines approach one or more of the extraordinary vertices.

13. A method, as in claim 6, where the new spacing is uniform as the iso-parameter lines approach one or more of the extraordinary vertices.

14. A three dimensional model re-parameterization computer system comprising:
a memory configured to store one or more Catmull-Clark models, each of the models having one or more surfaces and one or more extraordinary vertices, where one or more adjacent iso-parameter lines have a natural spacing between them that changes as the iso-parameter lines approach the extraordinary vertex; and
a processor configured to perform a re-parameterization process that re-parameterizes the model so that one or more of the extraordinary vertices have adjacent iso-parameter lines with a new spacing that is different than the natural spacing as the lines approach the extraordinary vertex and such that first-order derivatives based on the re-parameterized model converge near extraordinary vertices of valence greater than four.

15. A system for surface re-parameterization of a surface around extraordinary vertices of a computer three-dimensional Catmull-Clark model comprising:
means for re-parameterizing of one or more subdivision surfaces of the Catmull-Clark model with a plurality of vertices and at least one extraordinary and that has iso-parameter lines with spacing that is different than an original natural spacing, as the iso-parameter lines approach the vertex, the one or more sub-division surfaces being re-parameterized such that first-order derivatives based on the re-parameterized one or more surfaces converge near extraordinary vertices of valence greater than four; and
at least one of memory means configured to store the iso-parameter lines with the new spacing and display means for displaying the iso-parameter lines with the new spacing.

16. A computer program product comprising a computer useable medium having computer readable program code embodied therein for surface re-parameterization of a surface around extraordinary vertices of a computer three dimensional Catmull-Clark model, the computer program product comprising:
program code for re-parameterizing one or more subdivision surfaces of the Catmull-Clark model with a plurality of vertices and at least one extraordinary and that has iso-parameter lines with spacing that is different than an original natural spacing, as the iso-parameter lines approach the vertex, the one or more sub-division surfaces being re-parameterized such that first-order derivatives based on the re-parameterized one or more surfaces converge near extraordinary vertices of valence greater than four.

* * * * *